United States Patent

[11] 3,600,936

| [72] | Inventor | William R. Turner<br>Silver Spring, Md. |
|---|---|---|
| [21] | Appl. No. | 718,024 |
| [22] | Filed | Apr. 1, 1968 |
| [45] | Patented | Aug. 24, 1971 |
| [73] | Assignee | Vitro Corporation of America |

[54] TRANSCEIVER ULTRASONIC IMAGE SYSTEM
17 Claims, 9 Drawing Figs.

| [52] | U.S. Cl. | 73/67.9, 340/3 R, 340/5 MP |
|---|---|---|
| [51] | Int. Cl. | G01n 29/00 |
| [50] | Field of Search | 73/67.5, 67.6, 67.7, 67.8, 67.9; 315/12, 55; 340/5; 178/6; 310/8.3 |

[56] References Cited
UNITED STATES PATENTS
3,213,675  10/1965  Goldman............ 73/67.5

*Primary Examiner*—Richard C. Queisser
*Assistant Examiner*—Arthur E. Korkosz
*Attorney*—Jones and Lockwood ABSTRACT: A high conductance cathode-ray tube for ultrasonic applications employing a continuous piezoelectric conversion face plate capable of generating ultrasonic signals when swept by a cathode-ray beam, as well as accepting reflected ultrasonic echo signals which modulate the cathode-ray beam to obtain electronic manifestations of the received signals, and method of using same. A two-gun tube modification, one gun utilized for signal emission and the other for signal reception, in conjunction with a common piezoelectric plate, is also disclosed.

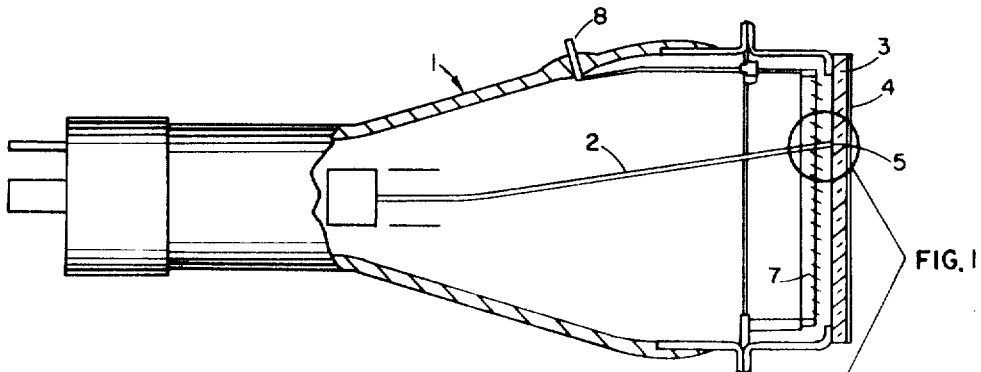
FIG. 1
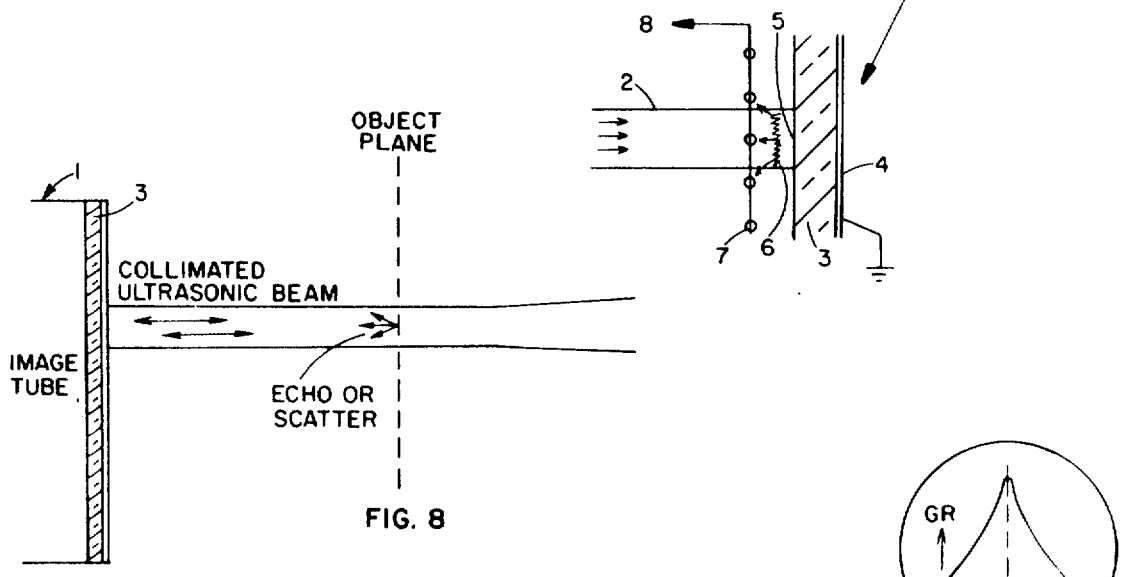
FIG. 8
FIG. 2
INVENTOR WILLIAM R. TURNER

INVENTOR WILLIAM R. TURNER
BY
ATTORNEY

TRANSCEIVER ULTRASONIC IMAGE SYSTEM

This invention resides in the utilization of a high conductance ultrasonic image converter in a transceiver mode of operation whereby the same transducer apparatus serves as both the source of the ultrasonic energy projected to an object, and also as the image detector for the returning reflected or scattered ultrasonic energy.

Heretofore, ultrasonic image systems have utilized separate sources of ultrasonic energy, these being placed in proximity of the detector or behind the object to be observed, depending on reflecting or transmitting mode of observation, respectively. For some reflective inspection or observation geometries, a source is desired that is coincident with the piezoelectric converter, by reason of either space limitations or the scattering characteristic of cathode-ray to be imaged. This invention not only provides a source of ultrasonic energy that is coincident with the image tube, but utilizes the image tube itself as this source, and concentrates the ultrasonic energy so produced to the specific regions of the object which are to be ultrasonically imaged.

Although the transceiver mode of operation might be applied to other types of electronic ultrasonic image converters, the optimum performance is achieved by modifying the high conductance type image converter described in the inventor's prior U.S. Pat. No. 2,903,617, and his article on Ultrasonic Imaging published in "Ultrasonics," for Oct.-Dec. 1965, pp. 183-187.

Other approaches to coincident ultrasonic detection and imaging by way of cathode-ray tubes will be found in prior U.S. Pats. No. 2,164,125 to Sokoloff, and U.S. Pats. Nos. 2,848,890 and 3,013,170 to Sheldon.

The principal object of this invention is to provide an improved imaging tube which utilizes the same piezoelectric face plate and cathode-ray structure to emit and receive ultrasonic signals.

A further object is to provide a unitary coincident source of ultrasonic signal generation and detection which permits improved synchronization between transmitted and received signals.

A more specific object is to provide an improved, compact ultrasonic cathode-ray tube utilizing a unitary cathode ray beam and a common raster generating structure in reciprocal transmitting and receiving modes of operation.

A further specific object of the invention is to provide an ultrasonic cathode-ray tube having a continuous piezoelectric face plate adapted to generate signals from discrete areas impinged by a cathode-ray beam.

A still further object is to provide a cathode-ray ultrasonic transceiver tube utilizing two cathode-ray guns and a single piezoelectric face plate, one of said guns functioning in transmitting mode, the other in receiving mode.

The above and other related objects will be more fully understood from the following description and appended drawings in which FIG. 1 is a cutaway section of a representative imaging tube.

FIG. 2 is a diagrammatic analog circuit illustrating tube function in transceiver mode.

FIGS. 8 and 9 show alternative embodiments of propagation and reflection of ultrasonic waves utilized in the subject invention.

Figure 3:
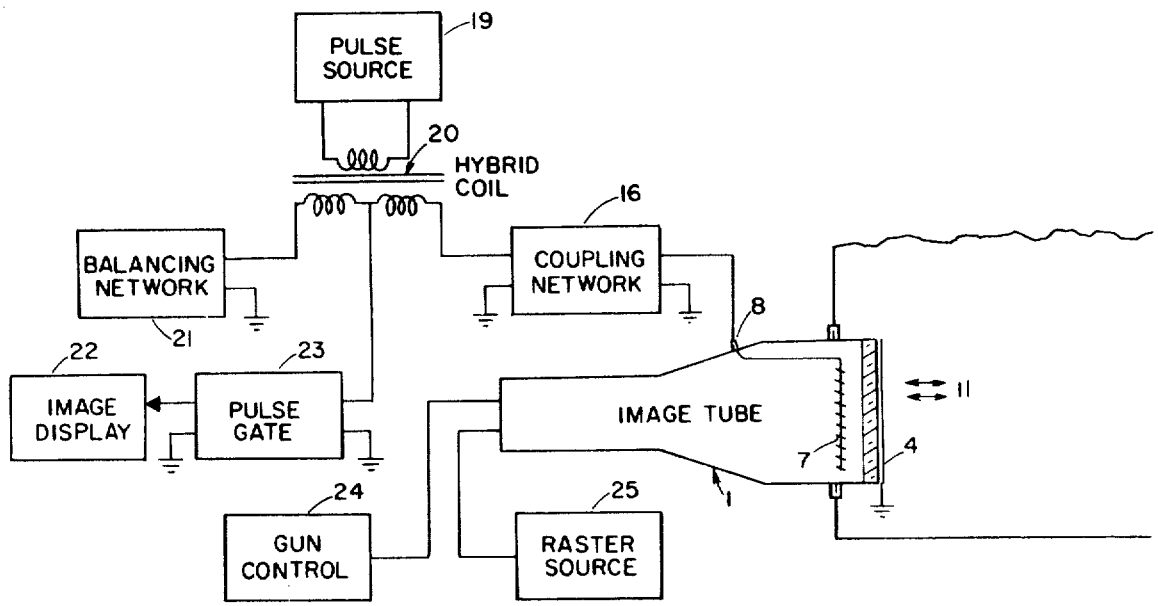
FIG. 3 is a block diagram of one transceiver mode operating circuit.

Referring to FIG. 1, the structure of the high conductance image tube 1 comprises an envelope, a piezoelectric conversion face plate 3, a closely spaced, but highly transparent conductor screen 7 mounted in close proximity to the conversion plate, a cathode-ray gun and conventional deflection and focusing means therefor (unnumbered), and a grounded conductive membrane 4 on the face of the conversion plate. The operational characteristic of this tube which delineates it from prior electronic-ultrasonic image converters lies in the utilization of converter plate 3 for bidirectional conversion of signals. When operating in sending mode, the nonconductive inner surface of conversion plate 3 is impinged by cathode-ray beam 2 through screen 7, whereby each landing point 5 of the plate acts as a discrete transducer to convert the energy of the C.R. beam into ultrasonic signals; conversely, operating in a receiving mode, ultrasonic energy received by a discrete area of the conversion plate acts in conjunction with screen 7 to convert an ultrasonic signal into an electronic one by modulating cathode-ray beam 2. The nonconductive target surface of piezoelectric plate 3 has a secondary emissive yield greater than unity, and the screen 7 acts to pick up secondarily emitted electrons from landing point 5 of cathode-ray beam 2. An effective electronic to ultrasonic conversion is attained by proportioning the electron beam diameter and current in relation to the screen spacing so that a high conductance path is formed between the beam landing area and signal screen, the conductance being high in comparison to the conductance of the conversion element itself.

A space charge 6 arises in front of may electron emitter such as the beam landing point 5 when the electric field in front of the surface is insufficient to accelerate an emitted electron to an escape velocity through the retarding field of previously emitted electrons. Such an electron decelerates to a zero velocity, thereby forming an element of the space charge, and then is free to move in either direction, either returning to the emission surface or moving forward to a capture electrode such as screen 7. The direction is set by minute changes of electric field in the vicinity of the zero velocity position and the random fluctuation in emission velocity.

Where secondary emission arises from an insulated surface, such as the landing point 5, the potential of the surface will increase if more electrons leave the surface than are incident upon it, or the potential will decrease if electrons accumulate on it. The space charge serves to establish an equilibrium potential on the emission surface by either reflecting secondary electrons back to the surface, or transmitting them to the capture screen to equal the electron flow in the primary electron beam striking the emission surface. In a high conductance image tube, this equilibrium is reached in a very short time interval compared to that of the ultrasonic wave to be transmitted or received.

The relation between the equilibrium electron current and the potential defining the electric field in front of the emission surface is given by, $$I_{eq} = \frac{A}{(L-L_e)^2}(V_c - V_s + V_e)^{3/2} \times 2.335 \times 10^{-6} \text{ Ampere} \quad (1)$$

where $A$ is the space charge area, $L$, the spacing from the emission surface to the capture electrode, $L_e$, the distance from the emission surface to the plane of minimum electron velocity, $V_c$, the capture electrode potential, $V_s$, the emission surface potential, and $V_e$, the average secondary emission velocity in electron volts.

Alternatively, the relation between the current and the potential difference between the capture electrode and the beam landing point can be defined as a small signal conductance, $$G_x = I_{eq}^{1/3} \left[\frac{\sqrt{A}}{L}\right]^{4/3} 2.64 \times 10^{-4} \text{ mhos.} \quad (2)$$

where $L_e$ can be ignored in relation to $L$. Thus, the action of the electron beam can be represented as a conductive (or resistive) link from the beam landing point 5 to the screen 7. This provides a bilateral path for alternating current flow between the beam landing point and the screen.

The electronic characteristics of the high conductance image tube are further presented in FIG. 2 by the equivalent analog circuit for the image tube and its associated coupling network. Although the image conversion plate is continuous in extent, it can be represented for analysis purposes as being divided into a multitude of discrete elements, each having an area equal to the space charge area in the impinging electron beam. Three such elements are represented in FIG. 2, and comprise a capacitance 9, being the electrical capacitance of the element when the front face of the conversion plate is coupled to an ultrasonic transmission medium 11 such as water. An ultrasonic excitation of the element by energy arriving through the transmission medium is represented by the current generator 12. The result of such excitation is an alternating potential on the landing point 5. Alternatively, an internal excitation of the element by an alternating current impressed upon the landing point, will cause current to flow in the radiation admittance, and hence a conversion into ultrasonic energy that is projected into the transmission medium.

The action of the electron beam is to establish a conductance 13, as defined by equation 2 between the discrete beam landing point 5 of a particular element and the capture screen 7, thereby coupling this element to the image tube terminal 8. The application of a high frequency voltage at terminal 8 consequently will excite the particular element and cause it to emit ultrasonic energy. Conversely, the application of ultrasonic excitation to the particular element will produce an electrical signal at terminal 8. This is a transceiver mode of operation. However, parasitic elements within the image tube limit the usefulness of this operating mode. A special coupling network 16 at terminal 8 can improve operation. Further improvement will result if the transmission excitation is applied as a current modulation of the electron beam, as will be described below.

One important parasitic component is the electrical capacitance 14 that couples each element in parallel to screen 7. Thus, while a high frequency voltage applied to terminal 8 is coupled by the beam conductance 13 to only one particular element, it is coupled by the parasitic capacitance 14 to all other elements in parallel. Thus, the remainder of the conversion plate around the beam landing element radiates some low intensity of ultrasonic energy.

Another important parasitic component is the electrical capacitance 9 of the element itself. In a conversion material such as quartz, the susceptance of this capacitance may exceed the radiation conductance 10 by an order of magnitude or more. Thus, a large portion of the excitation current applied at the landing point is shunted through the element capacitance, instead of through the radiation conductance.

The effect on performance of these parasitic capacitances is significantly reduced by the use of coupling network 16 that exhibits at its terminals a negative capacitance 17, in parallel with a termination conductance 18. This is a class of network described in detail by H. W. Bode in his book "Network Analysis and Feedback Amplifier Design." The negative capacitance must be sustained over a frequency bandwidth sufficient to include the important sidebands of the electrical signal. It cancels the effect of the stray capacitances 14 and 15 terminating on screen 7 and terminal 8, respectively, and through the beam conductance 13 the capacitance 9 of the beam landing point element only. Thus, the current through the radiation conductance 10 of this element is significantly increased and thereby the ultrasonic radiation is enhanced in relation to the capacity coupled energy being radiated by adjacent elements. Similarly the output signal for ultrasonic energy falling on the landing point element is enchanced in relation to the capacity coupled signal from adjacent elements.

Cancellation by the negative capacitance network of the landing point element capacitance through the beam conductance is only possible if the beam conductance exceeds the critical value $$G_1 = B_1 \left[ \frac{\sqrt{2G_t+1}}{B_1} + 1 \right] \quad (3)$$

where $B_1$ is the susceptance of the element capacitance 9, and $G_t$, is the termination conductance 18.

A further benefit derived from the negative capacitance class of coupling network is electrical control of the landing point element, factor Q. For maximum electrical/ultrasonic coupling the conversion plate is dimensioned for a thickness resonance at the ultrasonic frequency. The typical variation of radiation admittance 10 with frequency as a result of this resonance is shown circled in FIG. 2. The resonance is a consequence of energy storage within the conversion plate, the degree of which is denoted by the Q factor. For a half-wavelength thick quartz plate coupled to a water transmission medium, the Q is approximately 16, and increases proportionately at the higher resonance modes.

Electrical reduction of the landing point element factor Q becomes important in pulsed operation of a transceiver image tube because the minimum depth resolution for an ultrasonic system employing the tube is fixed by the "ringing" associated with energy storage in the conversion plate. The limiting resolution can be increased by reducing the Q. This can be accomplished by electrically shunting the landing point element provided that the susceptance of the element capacity is reduced to a value significantly lower than the radiation admittance. This is achieved by use of the negative capacitance class of coupling network through cancellation of the element capacitance over the beam conductance path. The beam conductance 13 in series with the termination conductance 18 then electrically loads the landing point element and reduces its Q.

One manner in which the high conductance image converter can be electronically connected for transceiver operation will now be described in detail in connection with FIG. 3. The face portion of the image converter tube 1 is shown on the right, and the associated electronic circuits on the left.

The outgoing signal is generated by the pulse source 19 which emits a burst or pulse interval of single frequency sinusoidal energy. This is coupled into the hybrid coil 20; the source power being divided, one half being dissipated in the balancing network 21 and the other half being transmitted through the coupling network 16 to the image tube signal terminal 8 connected to screen 7. The coupling network serves to match the hybrid network to the screen, cancelling the shunt capacitance of the screen, as previously described.

Tee high conductance path between conversion plate 3 and screen 7 (see FIG. 1), formed by the secondary emission and the space charge, transfers the source energy to the conversion plate 3, concentrating it in the area of electron beam impingement and producing an AC potential between this beam landing spot and the grounded front electrode 4. Thus an element of the conversion plate, defined by the electron beam diameter, is electrically excited and this electrical energy is converted into ultrasonic energy that is projected into the liquid transmission medium 11 as an ultrasonic signal.

The mechanism by which this ultrasonic energy is directed to and received back from a specific object point will be dealt with below. For the purpose of describing the transceiver operation, we will consider that energy reflections or echoes arising out of the liquid transmission medium will be scattered or focused back upon the conversion plate. These will be converted to an electronic signal, which in turn will be transferred from the insulated surface to the signal screen over the same conductive path formed by the secondary emission and space charge produced by the electron beam.

The received signal will be transmitted from screen 7 to the coupling network 16, to the hybrid network 20, and from this network to image processing circuits 22 through gate 23 as disclosed in the inventor's prior patent and publication, above. The function of the hybrid network in this illustrative example is to separate the transmitted and received pulses, so that the transmitted signal does not overload the input circuits 22 to the image-processing system. This function results from the balanced nature of the hybrid network. Other electronic techniques exist for accomplishing this objective, among these being diode switching networks, gaseous discharged TR tubes such as are used in radar systems, etc.

By actuation of gate 23 at a proper time after the outgoing pulse transmission, reception can be restricted to a distance zone in front of the image tube, thus permitting detection of a desired echo from a chosen plane or a sequence of planes, and the suppression of other echoes representing unwanted reverberation.

The electron beam 2 in the image tube can be projected by various standard electron guns, with acceleration and focusing functions being provided by the electron gun control 14. This electron beam is deflected to various portions of the conversion plate by electrostatic or electromagnetic deflection under control of a raster source 25.

Figure 4:
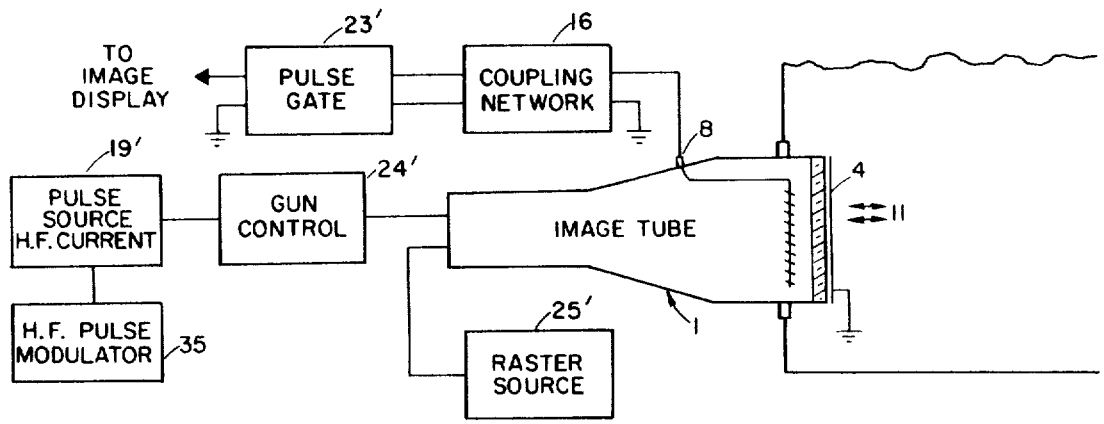
FIG. 4 represents a modified circuit arrangement.
Figure 5:
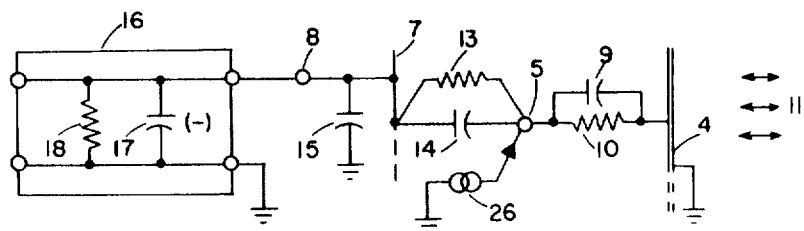
FIG. 5 is an analog diagram illustrating the operation of the embodiment of FIG. 4.

Another manner in which the high conductance image converter can be electronically connected for transceiver operation will now be described in connection with FIGS. 4 and 5. For transmission, the electron beam 2 is modulated by applying a burst or pulse interval of single frequency sinusoidal energy from the pulse source 19 to the electron gun control 24'. This superimposes a burst of high frequency current on the electron beam which terminates on the landing point 5 and is equivalent to the current generator 26 in FIG. 5. The received signal will be transferred from the insulated surface to the signal screen 7 as before, and thence to the coupling network. However, the hybrid network and the balancing network will no longer be needed, the coupling network being connected directly to the pulse gate 23', and thence to the image display.

The advantage of this alternate electronic connection is to further enhance the intensity of ultrasound transmitted by the landing point element in relation to the parasitic radiation from adjacent elements. This occurs because the transmission current is directly applied to the landing point 5, and is reduced significantly in level before it reaches screen 7 for capacity coupling to the remainder of the plate by the series admittance comprising the beam conductance 13, the coupling capacitance 14, and the shunt admittance of the coupling network 16. Due to the high screen transparency, the beam modulation current directly terminating on the screen will be 5 percent or less, and insignificant in its transmission action in comparison to the current terminating on the landing point 5. The coupling network 16 continues to perform the function of cancelling the element capacitance 9 and to provide electrical control of the factor Q, on plate 3.

For either manner of connection, the excited element on the image tube conversion plate in the transceiver mode of operation becomes the equivalent of a small ultrasonic transducer. The physical location of this element will be moved on the conversion plate by raster control 25' from one spot to another, thereby forming discrete, selectively activated transducers.

By the use of slow scanning speeds, a continuous scanning movement might be tolerated. The limit would be a speed at which the transit time of the energy traveling out to a reflection point and back to the conversion plate would produce an undesirable space separation between the points of transmission and reception. This space separation will become a severe problem if the transmitted energy is focused to a small region on the object, and the received energy to a small region on the image conversion plate, In this instance, satisfactory operation can be achieved by "stepping" the electron beam.

Figure 6:
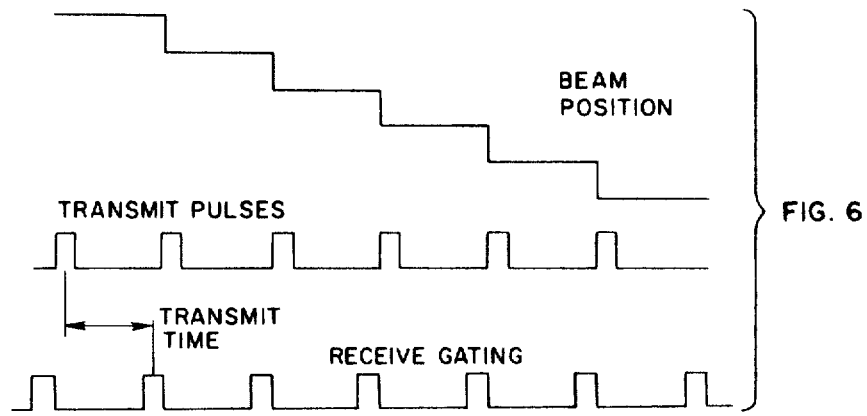
FIG. 6 is a pulse diagram illustrating a possible mode of transmit-receive sequence.

In stepped operation, as illustrated in the diagram of FIG. 6, the electron beam would be held stationary at one point a sufficient time to include the outward transmission interval of the ultrasonic pulse, the transit time to and from the object point, and the subsequent reception gating interval. The beam would then be stepped to the next position and the cycle repeated.

As transit times become long, the time interval for each cycle would increase, and the frame repetition time, or the total time necessary to excite and receive from all elements on the conversion plate could become excessive. Much of this time would be "dead time" during which neither transmission nor reception is taking place. Since the electron beam is inertialess, and can be rapidly stepped from one position on the converter plate to another, this invention conceives the fuller utilization of the time interval between transmission and reception at a particular element by stepping the beam to one or more other elements alternately for reception of previously transmitted signals, and the transmission of new signals, before returning to a particular element for reception. Such stepped scanning rasters would require digital control, but with digital control could be highly versatile in terms of allowable transit times to the target.

Figure 7:
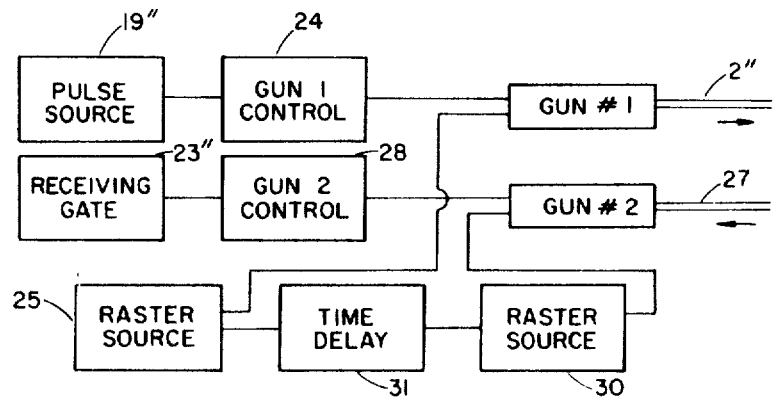
FIG. 7 shows a further embodiment utilizing a two-gun transceiver tube.

An alternative approach to fully utilizing the "dead time," shown in FIG. 7, is the installation of a second electron gun in the image tube with an independent gun control 28 and raster source 30. For transmission, pulse source 19" would turn on electron beam 2" during transmission intervals and superimpose upon it a high frequency current. For reception, the receiving gate 29 would turn on electron beam 27 during receiving intervals, simultaneous with the actuation of pulse gate 23". The position of beam 27, under control of raster source 30, would follow behind beam 2" by an interval set by the time delay 31 to equal the transit time. Transmitting and receiving intervals would alternate at a frequency set by the desired transmitting pulse length and receiving gate interval. A further advantage of the double-gun ultrasonic transceiver tube would be the flexibility of setting the currents and diameters separately for the transmitting and receiving beams.

If the excited conversion plate region is a number of wavelengths in diameter, the emitted ultrasonic beam will be collimated, or confined to a cylindrical propagation zone, within the near field diffraction region, and hence will be highly directional. As the far field diffraction zone is reached, however, the beam will begin to spread.

If the image tube to object plane distance can be restricted to the near field region of the ultrasonic beam, the image tube can be employed to detect a two-dimensional reflection variation at the object plane without the use of an ultrasonic lens, as shown in the sketch, FIG. 8.

The resolution of the resulting image would be set primarily by the sharpness of the transmitted beam and, secondarily, by the directivity of the conversion plate element in its receiving mode.

Such utilization of the image tube would be wasteful of its potential resolution because the element diameter necessary for collimated beam formation would be many times the diameter of maximum resolution.

Figure 9:
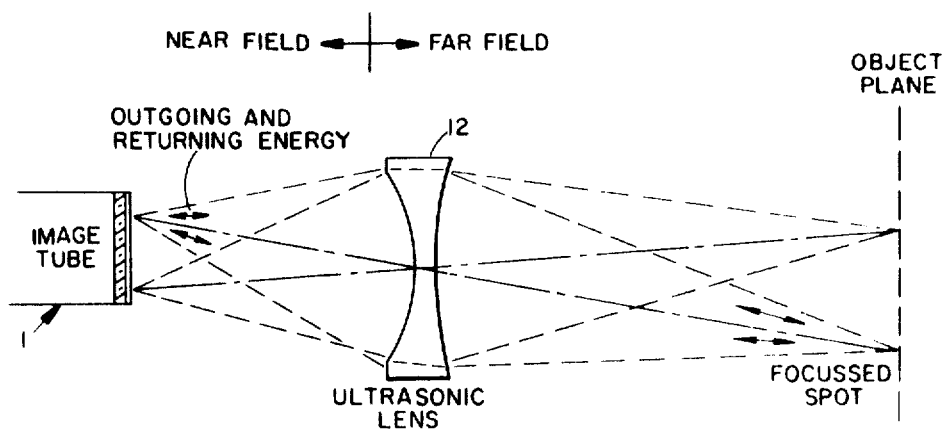

High resolutions can be obtained by interposing an ultrasonic lens 32 between the image tube 1 and the object plane as illustrated in FIG. 9. With a small diameter electron beam, the excited element on the conversion plate would approach a point source which would radiate ultrasonic energy over a wide angle. This scattered energy would be collected by the ultrasonic lens and focused to a small diameter image at the object plane, the size of the spot being determined by the diffraction and aberration characteristic of the lens. Thus, for each excited element on the image tube conversion plate, a corresponding region would receive ultrasonic excitation in the object plane. This would greatly reduce the reverberation that arises otherwise when an object plane is flooded uniformly with ultrasonic excitation, causing reverberant energy to reach the image tube from many different directions. Scattered energy from the object plane, at the point of excitation, would return to the originating point on the image tube, again being gathered by the ultrasonic lens, and focused into a small area at the conversion plate.

The utility of the above described device will be apparent to those skilled in the art. Previous devices of this class have been used for examination of human bodies, testing of materials for flaws and discontinuities, and other detection expedients involving modulation of ultrasonic signals. The present device is effective in producing a two-dimensional image, as well as a three-dimensional one, by electronic gating of reflected signals to different echo planes.

Having described the invention in detail, as well as the preferred modes of using same, it will be understood that modifications are possible within the scope of claims which follow:

I claim:

1. The method of generating and transmitting ultrasonic signals comprising the steps of
   a. Installing a piezoelectric conversion medium at the face of a cathode-ray tube,
   b. Providing a cathode-ray gun in said tube, and
   c. Impinging a cathode-ray beam on said medium, whereby electric energy of said beam is converted into mechanical vibration in the ultrasonic range, and emitted therefrom.

2. The method of claim 1 in which the conversion medium comprises a continuous face plate, the further step of sweeping said beam over said plate whereby successive discrete areas impinged by the beam function as individual transducers.

3. The method of claim 2 including the further step of controlling the sweep of the beam in a selective stepped sequence.

4. The method according to claim 2 in which said cathode-ray tube is utilized in a reciprocal mode of operation to both transmit and receive ultrasonic signals, the further steps of installing a signal pickup grid between said gun and conversion plate in proximity of the latter, generating an electronic signal thereon in the area of impingement by the cathode-ray beam, and transmitting said electronic signals to a video-processing system.

5. The method set forth in claim 4, including the step of providing a negative capacitance network and connecting it to the grid, to cancel the capacitance at discrete elements of the conversion medium and thereby increase the efficiency of signal conversion.

6. The method set forth in claim 5, including the step of proportioning the value of negative capacitance, beam conductance and termination conductance so as to reduce the Q factor of discrete element of the conversion medium.

7. A method according to claim 4 including the step of providing a raster means and controlling the stepping of the cathode-ray beam for concomittant generation and reception of ultrasonic signals.

8. The method of claim 5 including the further step of providing gating means operating in synchronism with the raster means for separating the transmitting and receiving functions effected by the cathode-ray beam.

9. The method of claim 8 including the further step of controlling the gating means so as to delay the signal reception with respect to signal transmission, whereby the cathode-ray tube may operate in a reflective mode.

10. The method of claim 9 including the further step of varying the delay by the gating means to thereby vary the time spacing and control the effective plane of reflection.

11. The method according to claim 8 wherein the raster is operated in variable interspersed relations with respect to different areas of the conversion plate in combined transmitting and receiving mode of operation.

12. The method of claim 5 including the step of placing the conversion plate in contact with an ultrasonic conductive medium, placing an object to be examined in line of transmission of signals by said plate in contact with said medium and recapturing the echo signals returned thereby by said plate.

13. The method of claim 12, including the steps of interposing a focusing lens between said conversion plate and object and adjusting the position of said lens along the signal beam to vary the effective plane under examination.

14. The method of claim 13 in which the ultrasonic conductive medium is a fluid.

15. The method in accordance with claim 2 in which the ultrasonic signals are transmitted to a medium under observation and are returned as echo signals to the conversion medium including the steps of providing a second cathode-ray gun, and sweeping the beam generated thereby over the piezoelectric conversion medium in time-delayed relation to the sweep of the first beam for receiving the echo ultrasonic signals induced by the first beam.

16. The method of claim 1, wherein the ultrasonic emission of the piezoelectric conversion medium is collimated by proportioning the beam impingement area of the conversion medium to a multiple of wavelengths in the ultrasonic transmission medium.

17. The method of claim 4 including the step of superimposing a high frequency current on said cathode-ray beam in its transmitting operational mode to enhance transmission to the discrete area impinged by the beam.